United States Patent [19]
Huyer

[11] Patent Number: 5,374,099
[45] Date of Patent: Dec. 20, 1994

[54] MOTOR VEHICLE HAVING AN OPEN ROOF CONSTRUCTION

[75] Inventor: Johannes N. Huyer, Velserbroek, Netherlands

[73] Assignee: Vermeulen-Hollandia Octrooien II B.V., Netherlands

[21] Appl. No.: 151,575

[22] Filed: Nov. 12, 1993

Related U.S. Application Data

[63] Continuation of Ser. No. 919,777, Jul. 23, 1992, abandoned.

[30] Foreign Application Priority Data

Aug. 13, 1991 [NL] Netherlands ............ 9101386

[51] Int. Cl.⁵ .................................. B60J 7/047
[52] U.S. Cl. ............................ 296/216; 296/223
[58] Field of Search .................. 296/216, 220, 223

[56] References Cited

U.S. PATENT DOCUMENTS

| | | | |
|---|---|---|---|
| 4,659,139 | 4/1987 | Hisaminato et al. | 296/210 |
| 4,893,869 | 1/1990 | Fuerst | 296/220 |
| 4,911,496 | 3/1990 | Fuerst | 296/220 |
| 4,946,225 | 8/1990 | Jardin et al. | 296/213 |
| 5,029,937 | 7/1991 | Yamamoto | 296/220 X |
| 5,100,197 | 3/1992 | Ichinose et al. | 296/216 |
| 5,104,178 | 4/1992 | Bienert | 296/216 |
| 5,114,208 | 5/1992 | Ikeda et al. | 296/216 |
| 5,154,482 | 10/1992 | Hayashi et al. | 296/216 X |

FOREIGN PATENT DOCUMENTS

| | | |
|---|---|---|
| 0200084 | 3/1988 | European Pat. Off. |
| 2619535 | 2/1989 | France |
| 3441719 | 5/1986 | Germany |
| 2059884 | 4/1981 | United Kingdom |

*Primary Examiner*—Joseph Pape
*Attorney, Agent, or Firm*—Westman, Champlin & Kelly

[57] ABSTRACT

A motor vehicle has a roof panel comprising an open roof construction including a closure element for selectively opening and closing a roof opening in the roof panel. On both longitudinal sides of the roof opening there are stationary mounted guide rails for guiding adjusting elements connected to the closure element. The guide rails are mounted to reinforcement sections arranged near the side edges of the roof panel.

18 Claims, 2 Drawing Sheets

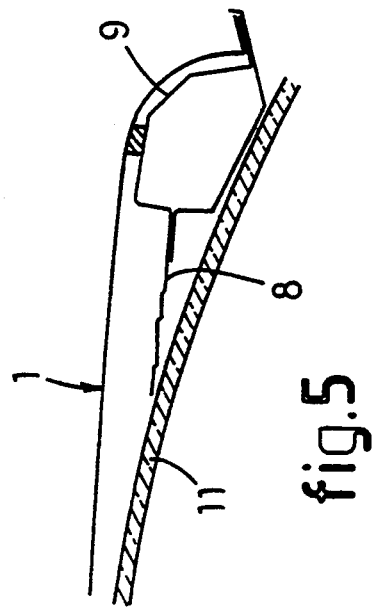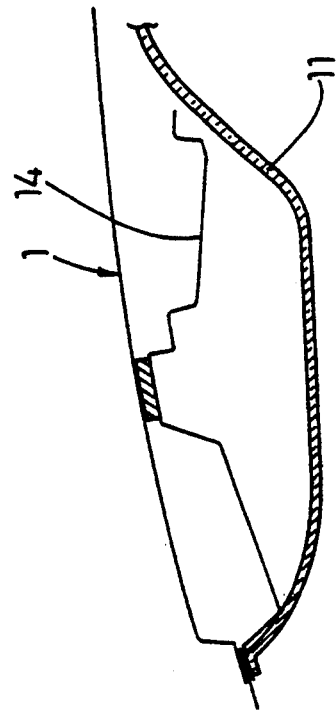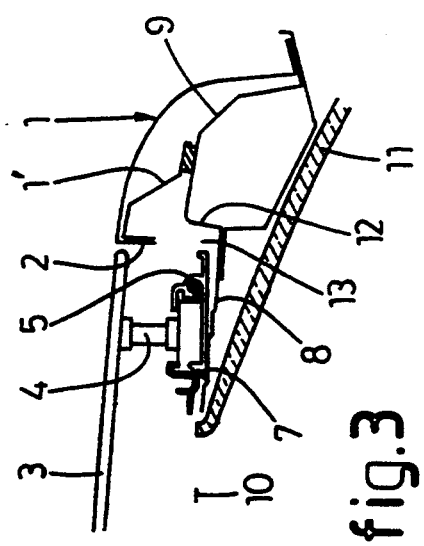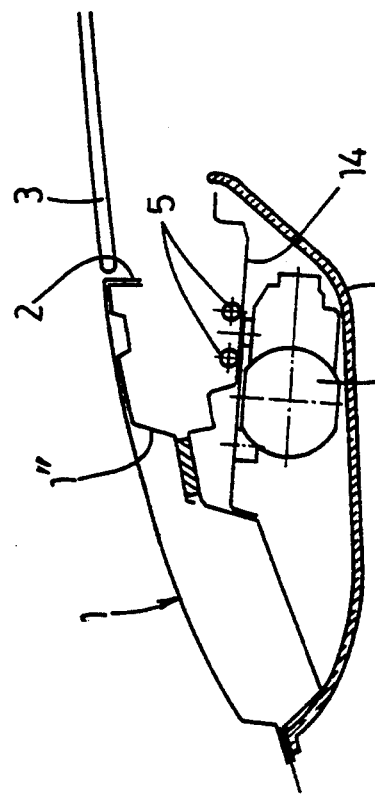

MOTOR VEHICLE HAVING AN OPEN ROOF CONSTRUCTION

This is a continuation of application Ser. No. 07/919,777, filed Jul. 23, 1992, now abandoned. Priority of the prior application is claimed pursuant to 35 USC § 120.

The present invention relates to a motor vehicle of which a roof panel comprises an open roof construction, having a closure element for selectively opening and closing a roof opening in the roof panel and having stationary mounted guiding rails on both longitudinal sides of the roof opening for guiding adjusting means connected to the closure element.

In known embodiments of motor vehicles, particularly passenger cars, having an open roof construction there is provided a stationary frame for the open roof construction which supports the parts of the open roof construction and in turn being attached to the roof panel of the motor vehicle. An example thereof is disclosed for example in U.S. Pat. No. 4,659,139. The attachment of the stationary frame to the roof panel and the seal therebetween are such that a wide roof opening in the roof panel can be obtained.

An object of the present invention is to provide a motor vehicle having an open roof construction in which still further possibilities are offered to obtain a wide roof opening.

For this purpose the motor vehicle having an open roof construction according to the invention is characterized in that the guide rails are mounted to reinforcement sections near the side edges of the roof panel.

Because it is not necessary anymore to use a separate stationary frame, because the guide rails are fixed directly to the lateral reinforcement section of the motor vehicle serving as stationary frame for the open roof construction, it is first possible to arrange the guide rails maximally outwardly with respect to the reinforcement sections to thereby enable a roof opening which is as wide as possible. Furthermore, the omission of a separate stationary frame saves on weight and costs and head space may be won in the interior of the vehicle.

The structurally best solution can be obtained if the motor vehicle is prepared from the start of its design to the arrangement of an open roof construction. Then, it is an advantage when the roof panel has a raised structure in comparison with the roof panel of a motor vehicle of the same type but without an open roof construction. Due to this feature the vehicle can be designed such that the structure of the motor vehicle of a certain type is always the same with the exception of the roof panel which is higher when an open roof construction is mounted in order to provide room to the parts of the open roof construction so that no head space for the passengers is lost at all.

A simple embodiment of the attachment of the guide rails to the lateral reinforcement sections is that in which each guide rail is mounted on an inwardly projecting flange of the respective reinforcement section, the roof opening in the roof panel extending laterally beyond the flanges.

In this case it is possible that the flange and an outwardly joining upwardly extending part of each reinforcement section form a water gutter for receiving and discharging leakage. Drain pipes for the water gutter may be arranged at the front and rear end of the lateral reinforcement sections.

The invention also includes an open roof construction which can be used in the motor vehicle as described above.

The invention will hereafter be elucidated with reference to the drawing showing an embodiment of the invention by way of example.

FIG. 3 is a sectional view along the line III—III of FIG. 2.

FIG. 4 is a sectional view along the line IV—IV of FIG. 2.

FIGS. 5 and 6 are sectional views corresponding to that of FIGS. 3, 4 respectively showing the same type of passenger car without a sliding roof.

Figure 1:
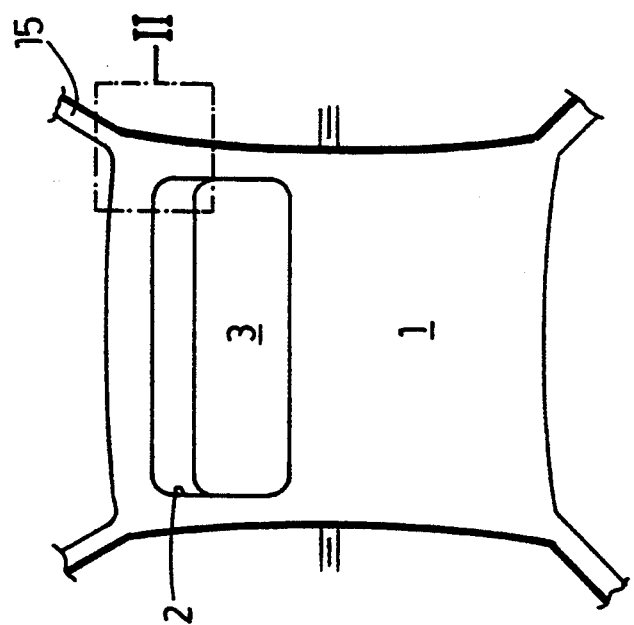
FIG. 1 is a very schematic plan view of a portion of a passenger car including a sliding roof construction according to the invention.

FIG. 1 shows a plan view of a motor vehicle constructed as a passenger car of which a roof panel 1 comprises a roof opening 2 which may selectively be opened and closed by means of a movable closure element. The closure element in this case consists of a rigid panel 3 which may or may not be transparent and which may also consist of a flexible or foldable closure element or of a panel including several parts. The panel 3 shown in the drawing is a part of a sliding roof construction of which the panel 3 is adapted to be moved from the closed position within the roof opening 2 downwardly and backwardly to an open position below the roof panel 1. Additionally the panel 3 could also be moved from the closed position to a backwardly and upwardly inclined tilted venting position.

As is mainly shown in FIGS. 3 and 4, the movements of the panel 3 may be effected by means of an adjusting means 4 connected to the panel 3 on both sides thereof and adapted to carry out adjusting movements by means of a drive cable 5 or the like. The drive cables 5 of the adjusting means 4 provided on both sides of the panel 3 are driven by means of a common electric motor 6 (see FIG. 4) which may also consist of a manually operated crank.

Each adjusting means 4 is arranged within a guide rail 7 extending in longitudinal direction of the passenger car and serving for movably supporting the several parts of the adjusting means 4, and for example also for guiding the drive cable 5 within the portion that extends in the longitudinal direction of the passenger car. In the embodiment shown, the guide rail 7 consists of an aluminium extruded section, but which may also consist of a steel rolled part having a plastic insert, for example.

According to the invention, the guide rail 7 is not mounted on a separate frame of the open roof construction, but directly on an inwardly extending flange 8 of a lateral or side reinforcement beam or section 9 of the passenger car. Due to this manner of fixing, a separate stationary frame for the open roof construction is redundant, while a further important advantage is that the guide rail 7 together with the adjusting means 4 can be displaced far outwardly in sideways direction thereby allowing a large roof opening 2 and a large passage opening 10 in an inner lining 11 in the interior of the vehicle for concealing the unfinished roof parts from sight, not withstanding the wide and rigid structure of the reinforcement beams 9.

From a comparison of FIGS. 3 and 5 it appears that with the same type of passenger car the embodiment including an open roof construction (FIG. 3) has a higher roof panel 1 than the embodiment of the same type without an open roof construction (FIG. 5) in order to provide enough space for arranging the guide rails 7 and adjusting means 4 between the flange 8 of the reinforcement beams 9 and the panel 3 of the open roof construction. The reinforcement beams 9 and the flanges 8 may be equal in both embodiments and are concealed from view by the inner lining 11. An additional connection part 1' connects the roof panel 1 to the upper side of the reinforcement beam 9. The flange 8 together with the joining upwardly extending part 12 of the reinforcement beam 9 may serve as water gutter for receiving leakage seeping in through the seal between the panel 3 and the roof panel 1. At the rear side of the roof panel 1 this watergutter extends inwardly creating thereby a mounting face for a drain pipe for conducting the leakage outside the body (not shown).

Figure 2:
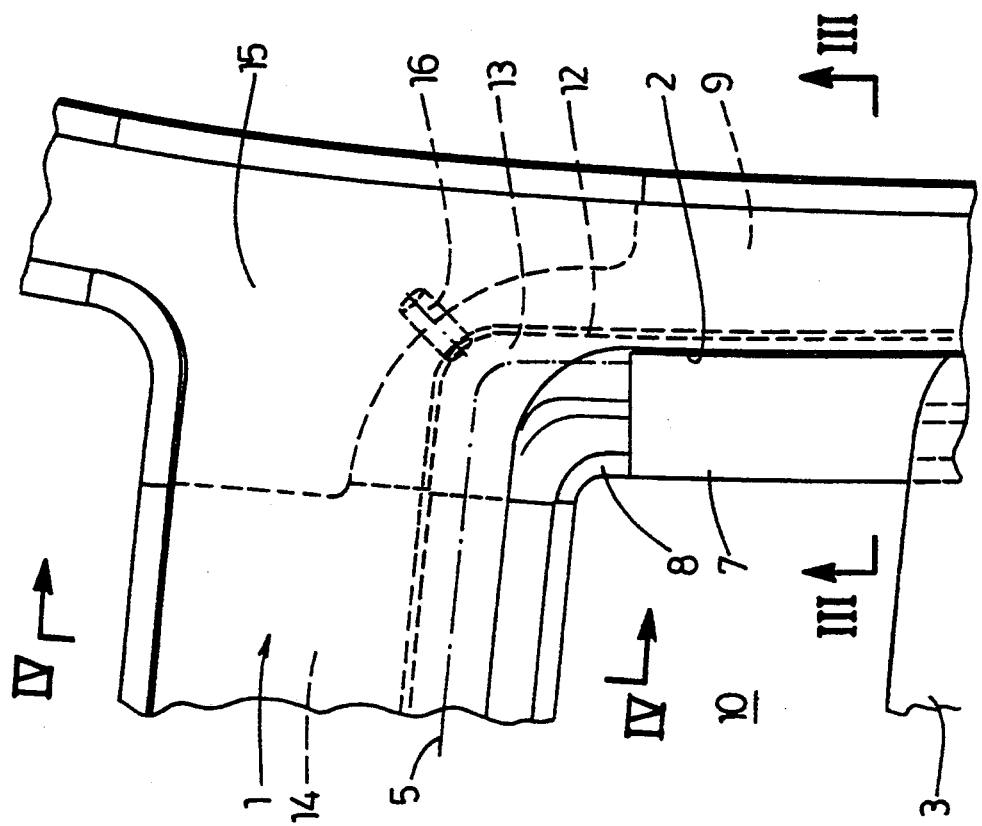
FIG. 2 shows on an enlarged scale detail II in FIG. 1.

As can be seen mainly in FIG. 4, a transverse or front reinforcement section 14 arranged below the front side of the roof panel 1 for reinforcement purposes serves as front beam of the open roof construction to support elements thereof, such as the drive cables 5 and the electric motor 6. The transition between the front reinforcement section 14, the lateral reinforcement beam 9 and the so-called A-jamb 15 is designed as front corner of the stationary frame of the open roof construction integrated in the passenger car where, for example, front drain pipes 16 for the water gutter 13 may be attached (see FIG. 2). The combination of the front reinforcement section 14 with the lateral reinforcement beam 9 results in a safety shell structure.

In a comparison of FIGS. 4 and 6 it will be clear that in the embodiment of the passenger car with (FIG. 4) and without (FIG. 6) open roof construction, the reinforcement section 14 remains the same and when an open roof construction is used only a connection part 1" is arranged between the reinforcement section 14 and the raised roof panel 1.

From the foregoing it will be clear that the invention provides a passenger car having an open roof construction offering many advantages, such as: no head room loss when an open roof construction is used, a roof opening having a maximum width, an optimum strength of the safety shell structure of the car, low cost of the open roof construction by integrating it in the shell structure of the car and no space problems when using hand grips, sun visors or such elements when an open roof construction is arranged.

The invention is not restricted to the embodiment shown in the drawing and described herein before by way of example, which may be varied in different manners within the scope of the invention. The invention is for example also used for in so-called spoiler roofs or folding roofs.

I claim:

1. A motor vehicle having a roof panel (1), the roof panel (1) having a roof opening (2) and roof side reinforcement sections (9) near opposite longitudinal side edges of the roof opening (2), each roof reinforcement section (9) being directly connected to a corresponding A-pillar of the motor vehicle, the motor vehicle further comprising a moveable roof panel assembly for selectively opening and closing the roof opening (2), the moveable roof panel assembly comprising:

a closure element (3) for selectively opening and closing the roof opening (2) in the roof panel (1);

adjusting means (4) connected to the closure element (3) below the closure element (3) for adjusting the closure element (3) to open and closed positions;

driving means connected to the adjusting means for actuating the adjusting means; and a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other.

2. The motor vehicle according to claim 1, wherein the mounting means comprises an inwardly projecting flange (8) from each side reinforcement section (9), the roof opening (2) in the roof panel (1) extending laterally beyond the inwardly projecting flanges (8).

3. The motor vehicle according to claim 2, wherein a water gutter (13) for receiving and discharging leakage is formed by the inwardly projecting flange (8) and an outwardly joining upwardly extending part (12) of each side reinforcement section (9).

4. The motor vehicle according to claim 1, wherein the roof panel (1) further includes a transverse reinforcement section (14) along another side edge of the roof opening (2), wherein the driving means is mounted to the transverse reinforcement section (14).

5. The motor vehicle according to claim 1, wherein the side reinforcement sections and a transverse reinforcement section along another side edge of the roof opening comprise a safety shell structure.

6. An open roof construction for use in a motor vehicle having a roof panel (1) with a roof opening (2), the roof panel (1) having roof side reinforcement sections (9) near opposite longitudinal side edges of the roof opening (2), each roof reinforcement section (9) being directly connected to a corresponding A-pillar of the motor vehicle, the open roof construction comprising:

a closure element (3) for selectively opening and closing the roof opening (2) in the roof panel (1);

adjusting means (4) connected to the closure element (3) below the closure element (3) for adjusting the closure element (3) to open and closed positions;

driving means connected to the adjusting means for actuating the adjusting means; and a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other.

7. The open roof construction according to claim 6, wherein the mounting means comprising an inwardly projecting flange (8) from each side reinforcement section (9), the roof opening (2) in the roof panel (1) extending laterally beyond the inwardly projecting flanges (8).

8. The open roof construction according to claim 7, wherein a water gutter (13) for receiving and discharging leakage is formed by the inwardly projecting flange (8) and an outwardly joining upwardly extending portion (12) of each side reinforcement section (9).

9. The open roof construction according to claim 6, wherein the roof panel further includes a transverse reinforcement section (14) along another side edge of the roof opening (2), wherein the driving means is mounted to the transverse reinforcement section (14).

10. The open roof construction according to claim 6, wherein the side reinforcement sections and a transverse reinforcement section along another side edge of the roof opening comprise a safety shell structure.

11. The open roof construction according to claim 6 wherein the driving means comprises a motor and drive cables connected to the motor and the adjusting means.

12. The open roof construction according to claim 6 wherein each of the longitudinal guide means comprises one longitudinal guide rail.

13. The motor vehicle according to claim 1 wherein each of the longitudinal guide means comprises one longitudinal guide rail.

14. The motor vehicle according to claim 1 wherein the driving means comprises a motor and drive cables connected to the motor and the adjusting means.

15. A motor vehicle having a roof panel (1), the roof panel (1) having a roof opening (2) and roof side reinforcement sections (9) near opposite longitudinal side edges of the roof opening (2), and a movable roof panel assembly for selectively opening and closing the roof opening (2), the movable roof panel assembly comprising:

a closure element (3) for selectively opening and closing the roof opening (2) in the roof panel (1);
adjusting means (4) connected to the closure element (3) below the closure element (3) for adjusting the closure element (3) to open and closed positions;
driving means connected to the adjusting means for actuating the adjusting means;
a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other; and
wherein the roof panel (1) further includes a transverse reinforcement section (14) along another side edge of the roof opening (2), wherein the driving means is mounted to the transverse reinforcement section (14).

16. A motor vehicle having a roof panel (1), the roof panel (1) having a roof opening (2) and roof side reinforcement sections (9) near opposite longitudinal side edges of the roof opening (2), and a movable roof panel assembly for selectively opening and closing the roof opening (2), the movable roof panel assembly comprising:

a closure element (3) for selectively opening and closing the roof opening (2) in the roof panel (1);
adjusting means (4) connected to the closure element (3) below the closure element (3) for adjusting the closure element (3) to open and closed positions;
driving means connected to the adjusting means for actuating the adjusting means;
a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other; and
wherein the side reinforcement sections and a transverse reinforcement section along another side edge of the roof opening comprise a safety shell structure.

17. An open roof construction for use in a motor vehicle having a roof panel (1), the roof panel (1) having roof opening (2) and roof side reinforcement sections (9) near opposite longitudinal side edges of the roof opening (2), and a movable roof panel assembly for selectively opening and closing the roof opening (2), the movable roof panel assembly comprising:

a closure element (3) for selectively opening and closing the roof opening (2) in the roof panel (1);
adjusting means (4) connected to the closure element (3) below the closure element (3) for adjusting the closure element (3) to open and closed positions;
driving means connected to the adjusting means for actuating the adjusting means;
a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other; and
wherein the roof panel (1) further includes a transverse reinforcement section (14) along another side edge of the roof opening (2), wherein the driving means is mounted to the transverse reinforcement section (14).

18. An open roof construction for use in a motor vehicle having a roof panel (1), the roof panel (1) having roof opening (2) and roof side reinforcement sections (9) near opposite longitudinal side edges of the roof opening (2), and a movable roof panel assembly for selectively opening and closing the roof opening (2), the movable roof panel assembly comprising:

a closure element (3) for selectively opening and closing the roof opening (2) in the roof panel (1);
adjusting means (4) connected to the closure element (3) below the closure element (3) for adjusting the closure element (3) to open and closed positions;
driving means connected to the adjusting means for actuating the adjusting means;
a support structure comprising two longitudinal guide means (7) spaced apart from each other for guiding and supporting the adjusting means (4) on the roof panel and mounting means for mounting each of the longitudinal guide means directly to a corresponding roof side reinforcement section (9) along each of the opposite longitudinal side edges and below the roof panel (1) and inwardly thereof with at least one pair of ends of the longitudinal guide means isolated from each other; and
wherein the side reinforcement sections and a transverse reinforcement section along another side edge of the roof opening comprise a safety shell structure.

* * * * *

UNITED STATES PATENT AND TRADEMARK OFFICE
CERTIFICATE OF CORRECTION

PATENT NO. : 5,374,099
DATED : December 20, 1994
INVENTOR(S) : Johannes N. Huyer It is certified that error appears in the above-indentified patent and that said Letters Patent is hereby corrected as shown below:

Column 4, line 61, delete "comprising" and insert --comprises--
Column 6, line 13, after having, insert --a--.(2nd occurrence)
Column 6, line 42, after having, insert --a--.(2nd occurrence)

Signed and Sealed this

Eleventh Day of July, 1995

Attest:

BRUCE LEHMAN

Attesting Officer

Commissioner of Patents and Trademarks